United States Patent [19]
Ecker

[11] Patent Number: 5,806,686
[45] Date of Patent: Sep. 15, 1998

[54] SORTING DEVICE AND ITS USE

[76] Inventor: Peter M. Ecker, Rte. 1, Box 1540, Trempealeau, Wis. 54661

[21] Appl. No.: 500,438

[22] Filed: Jul. 10, 1995

[51] Int. Cl.$^6$ ........................................ B07C 5/36
[52] U.S. Cl. .................... 209/615; 209/618; 209/658; 209/919; 198/663; 198/786
[58] Field of Search .................... 209/600, 601, 209/615, 616, 617, 618, 632, 658, 659, 660, 913, 919; 198/394, 663, 786

[56] References Cited

U.S. PATENT DOCUMENTS

| | | | |
|---|---|---|---|
| 665,365 | 1/1901 | Ferguson | 15/3.17 |
| 1,417,266 | 5/1922 | McDill | 15/3.2 |
| 2,178,185 | 10/1939 | Nicholson | 15/3.16 |
| 2,287,447 | 6/1942 | Peeples | 15/3.13 |
| 2,592,275 | 4/1952 | Grosvenor | 198/786 X |
| 4,380,294 | 4/1983 | Morris | 209/658 X |
| 4,789,290 | 12/1988 | Barnhart et al. | 198/786 X |
| 5,024,335 | 6/1991 | Lundell | 209/615 X |
| 5,285,548 | 2/1994 | Moll | 15/3.2 |

FOREIGN PATENT DOCUMENTS

| | | | |
|---|---|---|---|
| 7703119 | 9/1978 | Netherlands | 209/658 |
| 42869 | 5/1926 | Norway | 209/658 |

*Primary Examiner*—William E. Terrell
*Assistant Examiner*—Tuan N. Nguyen
*Attorney, Agent, or Firm*—M. Paul Hendrickson

[57] ABSTRACT

The present invention provides a unique mechanical method and device for sorting pieces (e.g. vegetables and fruits) of any desired size from unsorted and irregularly sized pieces. The device includes a pair of elongated cylindrical brushes, one of which is equipped with a spiraled furrow for propelling the unsorted pieces and another brush being a smooth surfaced bristled brush (an expelling brush) laterally positioned to the propelling brush so as to form a trough between the two brushes for longitudinally moving the pieces. The brushes are rotated in a common rotational direction. A contacting member, such as a pivotally mounted lever, traversing the trough and the smooth surfaced brush and laterally positioned above the trough at a predetermined distance will tangentially contact a piece of a desired sizing and guide the contacted piece along its interfacing surface. The rotational brushing movement of the smooth bristled expelling brush moves the contacted pieces along the contacting surface to a position where it may be expelled onto a collecting station.

16 Claims, 8 Drawing Sheets

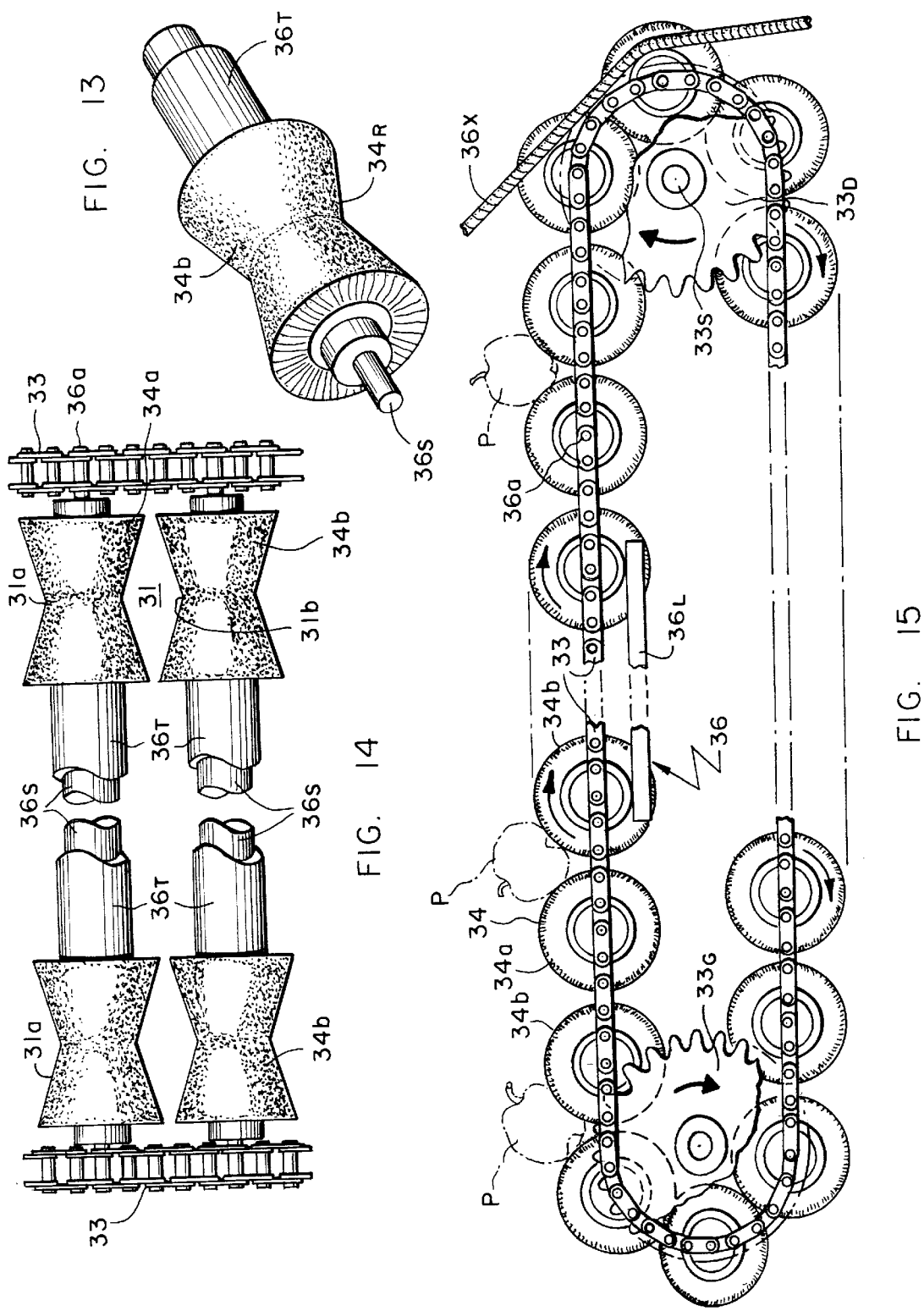

SORTING DEVICE AND ITS USE

FIELD OF THE INVENTION

The present invention relates to sorting and sorting devices and more particularly to a mechanical sorting device for separately selecting and sorting pieces of a uniform dimensional size from unsorted pieces of irregular sizes.

BACKGROUND OF THE INVENTION

The sorting of fragile or delicate pieces of a substantially uniform dimensional size from unsorted and irregular sized pieces is a tedious and laborious task. Such sorting difficulties are typified by the commercial need to sort freshly harvested fruit and vegetable produce into produce of a substantially uniform dimensional size. Fragile produce such as freshly harvested fruits and vegetables will often widely vary in dimensional sizes. Consumer preferences place a premium upon the marketing of packaged fruits or vegetables of a uniform size and consistency. This typically requires presorting of the fruits and vegetables to provide the desired uniformly sized product. Conventional sizing techniques, such as screening commonly used in sizing minerals such as aggregates and other mechanical sizing techniques, are generally inapplicable to the sizing of fragile skinned products such as vegetables or fruits. Electronic and mechanical sorting devices for individually weighing each produce piece and dropping the sorted pieces into conveying means have heretofore been used to sort fruit and vegetables by weight. Costly electronic optical sizing devices designed to discharge the optically sorted fruits onto a conveyor have been sparingly applied to expensive fruit and vegetable sorting processes. Damage caused by such sorting processes often decreases the quality and value of the sorted produce. puncturing or bruising only a few of the processed produce pieces usually renders the entire produce lot susceptible to premature spoilage.

A conventional manual sorting practice typically entails placing the unsorted produce upon a continuous apron or belt and stationing sufficient personnel or workers alongside the apron to manually sort the produce by size. Manual sorting techniques are costly and labor intensive. The bumping, pushing and commingling of produce pieces while sorting upon the apron often results in significant damage to the pieces. Comparatively, manual sorting inflicts considerably less damage to the produce than mechanical and electronic sorting techniques and, accordingly, constitutes the most commonly used sorting technique for delicate produce. The produce sorting techniques have remained relatively unchanged even though there exists a persistent need to sort produce more effectively and inexpensively.

A mechanical device capable of individually selecting and sorting delicate pieces of a predetermined dimensional size from unsorted and irregular pieces would fulfill a long felt need. Such a mechanical device could be effectively utilized to sort raw and unsorted produce (e.g. such as unsorted raw vegetables, fruits, eggs, etc.) into sorted produce of a uniform dimensional size. Further economic advantages would be realized if the mechanical sorting could be effectuated under operational conditions avoiding or minimizing sorting damage to the produce. A device capable of individually selecting and sorting a fruit or vegetable piece from unsorted bulk without puncturing, bruising or otherwise damaging the protective skin or underlying meat sections of the produce would fulfill a long felt need. Such a device would also substantially reduce the capital and labor expenses of sorting fruit and vegetable produce. premature spoilage and mechanically inflicted damage to the produce would also be substantially alleviated by a delicate mechanical handling, sorting and selecting of individual pieces with such a device. The sorting device would also be of benefit if the mechanical sorting could be effectuated with a sorting device constructed of component parts capable of operating for prolonged production periods with little, if any, maintenance or repair. Further advantages would arise if the sorting device could be adapted to produce polishing rollers fitted with a pressure sensitive sizer which would allow the desired sized fruit or vegetable piece to be selectively sorted.

SUMMARY OF THE INVENTION

The present invention provides a sorting device and method for sorting irregular sized or unsorted pieces. The device may be effectively utilized in providing produce pieces of a desired predetermined size from freshly harvested produce or unsorted, irregular sized fruit and vegetable produce. The sorting device includes a pair of elongated cylindrical brushes or bristled rollers laterally spaced apart so as to form a trough between the pair of brushes. One of the pair of brushes comprises a spirally grooved brush equipped with a spiraled channel or groove which, upon rotation of the grooved brush, serves to propel unsorted pieces along the grooved channel and the trough. An oppositely positioned smooth or uniformly surfaced bristled brush is laterally positioned to the spirally grooved brush and extends longitudinally in an abutting or juxtaposition relationship to the grooved brush. The smooth bristled brush and spiral brush are power-driven so as to rotate in the same rotational direction. The smooth bristled brush is typically operated at a higher rotational speed than the spiraled brush and serves to expel produce after the rounded piece has contacted upon a contacting member.

The unsorted and irregular pieces are propelled through the trough by spiral grooving of the spiral brush. One or more contacting members (serving as the pressure sensitive sizers, typically as a contacting arm, lever or paddle) are transversely positioned so as to bridge across the trough at an elevated position of a predetermined elevation for sizing produce of a desired size. The contacting members may be adjusted to precisely match any dimensional size of the unsorted pieces which are desired to be sorted or removed from the trough. The moving pieces are sorted by making contact onto the contacting member. The contacting member is hinged so that when a piece contacts against the member, the member will stop the contacting piece from its longitudinal movement along the spiraled groove of the spiraled brush within the trough. The contacting member is hinged at a hinging site positioned above the spiral brush. Upon contact with the moving piece, the contacting member stops the piece while the hinged contacting member (such as a hinged arm, lever or paddle) gently forces the stopped piece against the peripheral bristles of the smooth brush.

The sorting device operates differently than existing electronic and mechanical sorters. The present sorting device selectively lifts and gently deposits the sorted piece to an appropriate sorting station or collecting point. The smooth brush bristles lift and propel the piece outwardly from the trough while the hinged contacting member tangentially holds and prevents the produce from longitudinally advancing within the trough. As the smooth brush bristles gently lift the piece upwardly and outwardly, the paddle pivots about the hinging site to permit the piece to orbit about the circumferential surface of the smooth brush. The rotational movement of the smooth brush will orbitally move the stopped or retained piece laterally outwardly from the trough and about the circumferential surface of the smooth brush while the hinged arm gently holds and prevents the piece from longitudinally moving forward. Upon contact with the moving piece, the hinged arm will rise, retain, and maintain contact upon the food piece as it peripherally and transversely orbits about the circumscribing surface of the smooth brush. The hinged arm guides the selected piece along the arm until expelled from the trough by the smooth brush. The hinged arm then returns to its contacting position to stop another piece of the appropriate contacting size.

By adjusting the height or distance between the contacting member and trough vortex, the sorting device of this invention may be appropriately adjusted so as to individually select and sort a food piece of any desired predetermined dimensional size from an unsorted lot. The rotating brushes may be of any suitable length. Similarly, the diameter of the brushes may be sized to meet the different produce sizes with the larger sized for larger produce and the smaller for the smaller sized produce. The device may be fitted with a plurality of contacting members strategically positioned traversely along the trough for expelling produce of any desired size from the trough. The contacting members may be adjusted to varying heights so as to allow sorting of different sized pieces at different sizing stations along the entire length of the brushes. In such an arrangement, the contacting paddles at the beginning of the trough may be set at a higher elevation level than those further along the trough. Consequently, the larger sized pieces may be initially selectively removed while progressively smaller pieces may then be conveniently removed at subsequent sorting stations along the trough. The expelled sorted pieces may be suitably discharged onto a packing site where the segregated sized pieces of a substantially uniform dimensional size may then be packaged for shipment.

BRIEF DESCRIPTION OF THE DRAWINGS

FIG. 13 is an elevational side view of a partial conveying member depicted in FIG. 12.

FIG. 14 is a partial top view of the feed conveyor taken along line 14—14 of FIG. 12.

FIG. 15 is a cross-sectional view of the feed conveyor taken along lines 15—15 of FIG. 12.

DETAILED DESCRIPTION OF THE INVENTION AND PREFERRED EMBODIMENTS

Figure 1:
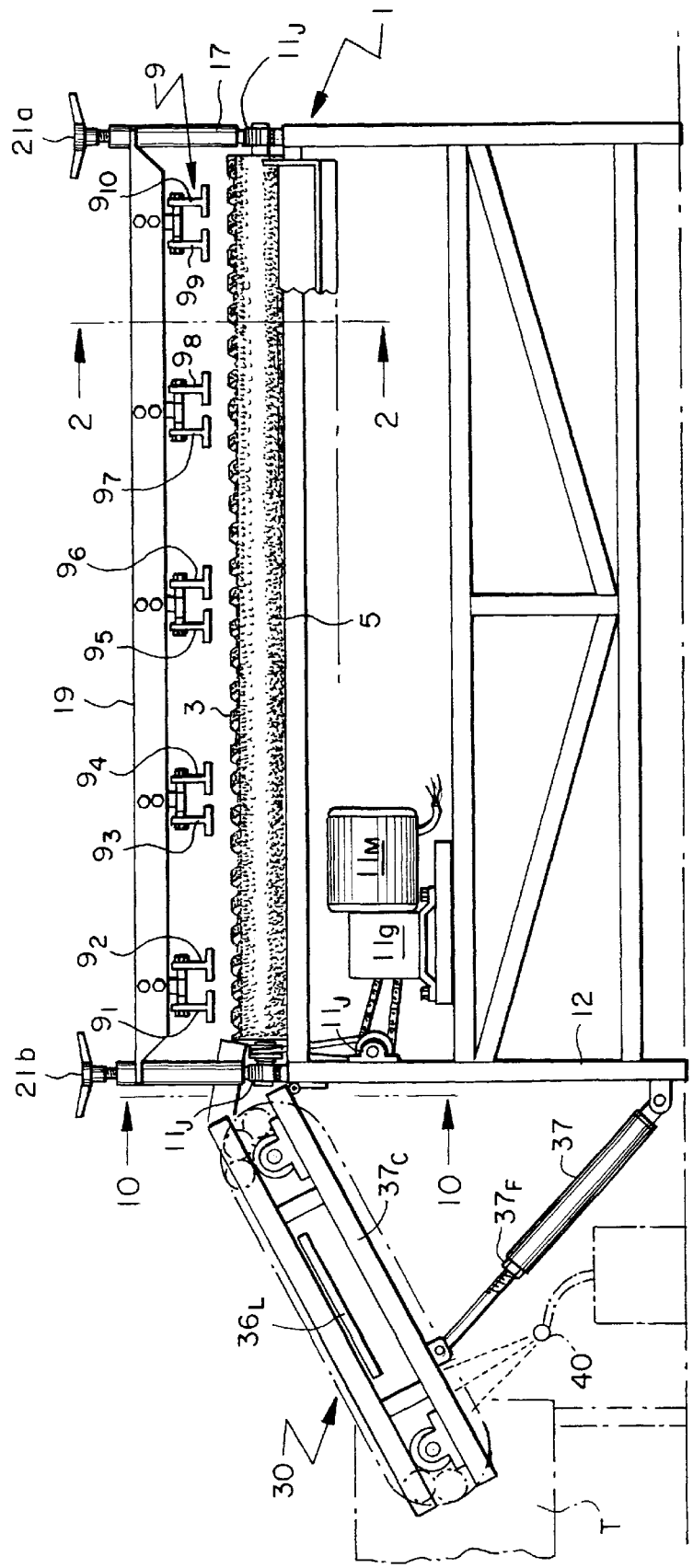
FIG. 1 is a side view of the sorting device of this invention equipped with a feed conveyor and a collecting table.

With reference to the drawings, there is provided pursuant to the present invention a sorting device (generally referenced as 1) for sorting selected pieces $P_s$ of a predetermined dimensional size from unsorted pieces P of diverse dimensional sizes, said device 1 comprising:

a) an elongated cylindrical first brush 3 equipped to rotationally move the unsorted pieces P about a peripheral longitudinal axis of said first brush 3;

b) an elongated cylindrical second brush 5 laterally spaced apart from said first brush 3 so as to form a trough 7 for moving the unsorted pieces P along the peripheral axis;

c) drive means 11 for rotationally rotating the first brush 3 and the second brush 5 in a corresponding rotational direction; and d) a contacting member 9 traversely bridging said trough 7 onto said second brush 5 with said member being laterally spaced apart from said trough 7 at a predetermined distance so as to permit tangential contact upon the selected pieces $P_s$ and guide the selected pieces $P_s$ along said member 9 away from said trough 7 by biasing the selected pieces $P_s$ between the contacting member 9 and said second brush 5 and allowing a rotational brushing movement of the second brush 5 to rotationally brush the selected pieces $P_s$ along said contacting member 9 until expelled from the contacting member 9 by said second brush 5.

FIGS. 1–12 depict the sorting device 1 and it use to sort pieces P of a desired size therewith. Pursuant to the present invention, the first brush 3 serves as a propelling brush 3 whereas the second brush 5 serves as an expelling brush 5 to expel the sorted pieces $P_s$ from the sorting device 1. The spiraled and bristled first brush 3 and the bristled second brush 5 provide a particularly effective resilient biasing means for gently propelling delicate fruit and vegetable produce P through trough 7. The contacting member 9 selects the appropriate sized piece $P_s$ and the flexible expelling brush 5, in cooperative association with guiding effect of contacting member 9, provide a gentle rotational expelling means when a fruit or vegetable piece P of the desired size tangentially contacts upon contacting member 9.

Figure 3:
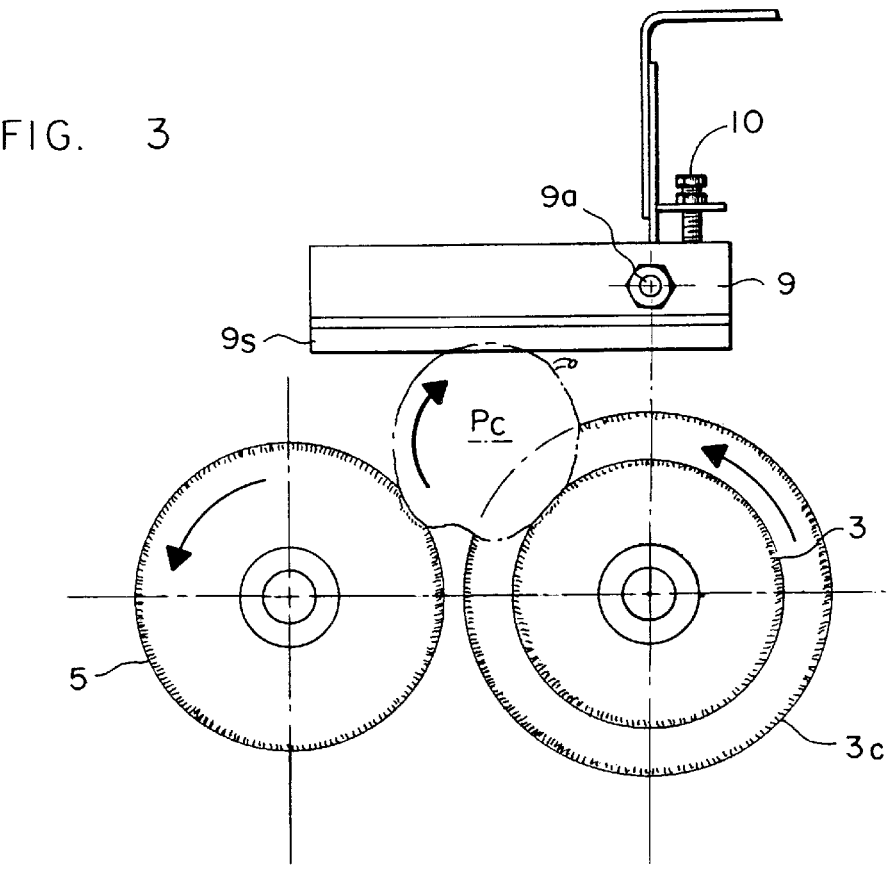
FIG. 3 is a partial enlarged cross-sectional view of the device shown in FIG. 2 depicting an unsorted produce piece actuating the selective sorting embodiments of the device.
Figure 4:
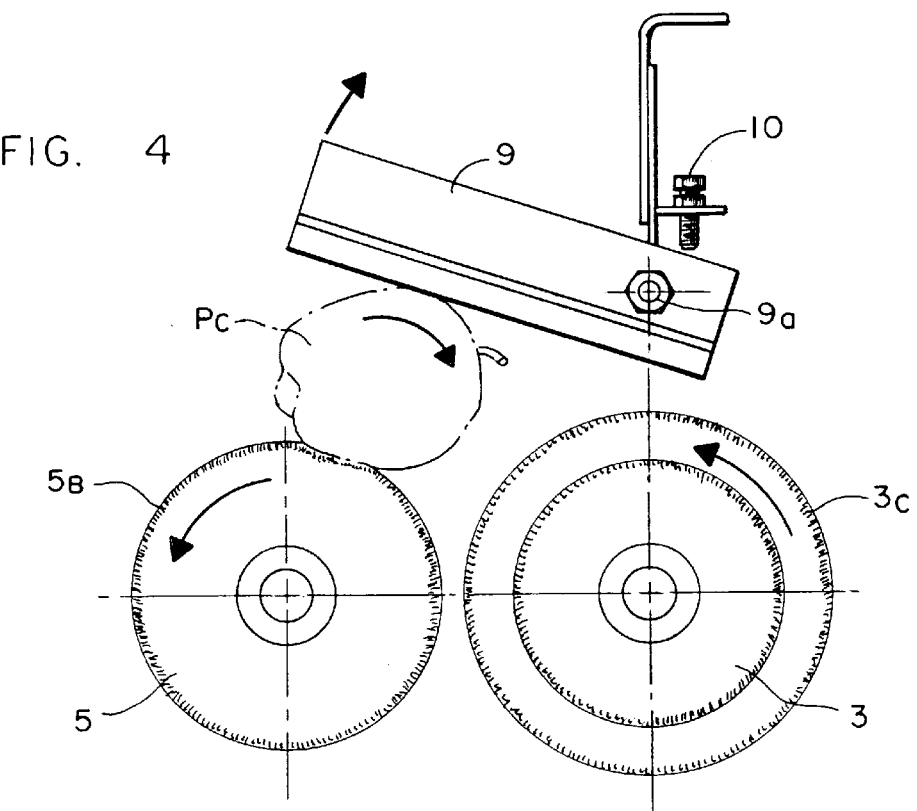
FIG. 4 illustrates the device shown in FIG. 3 selectively guiding and removing a selective produce piece.

Although any flexible expelling means which applies a constant and gentle pressure upon a contacting piece $P_c$ may be utilized to hold, guide and expel the desired selected piece $P_s$ from the device 1, a smooth bristled brush 5 in cooperative association with a hinged arm or paddle 9 (e.g. as illustrated in the FIGS. 1–5 and 11–12) are particularly well suited for this purpose. FIGS. 3–5 and 11 illustrate in greater detail the cooperative association of the component parts of the device in selecting, guiding and expelling a produce piece $P_s$ of a desired size from unsorted pieces P. The cooperative association of the hinged paddle 9 (adjustable to the appropriate contacting pressure and dimensional height) and the resiliency of the bristled brush 5 provides a gentle retaining site and means for expelling the sorted pieces $P_s$ from device 1. As the contacting paddle 9 holds or retains the contacted piece $P_c$ for expulsion (e.g. see FIG. 3), the bristles of the expelling brush 5 bend inwardly while gently brushing outwardly (e.g. see FIG. 4) so as to reduce the total compressive forces exerted upon the contacted piece $P_c$. As the contacted piece $P_c$ orbits about the peripheral circumference of the expelling brush 5, the contacting paddle 9 concurrently pivots (at a counterbalancing constant force) about its hinged mount 9a as depicted by FIGS. 3 and 4.

Figure 2:
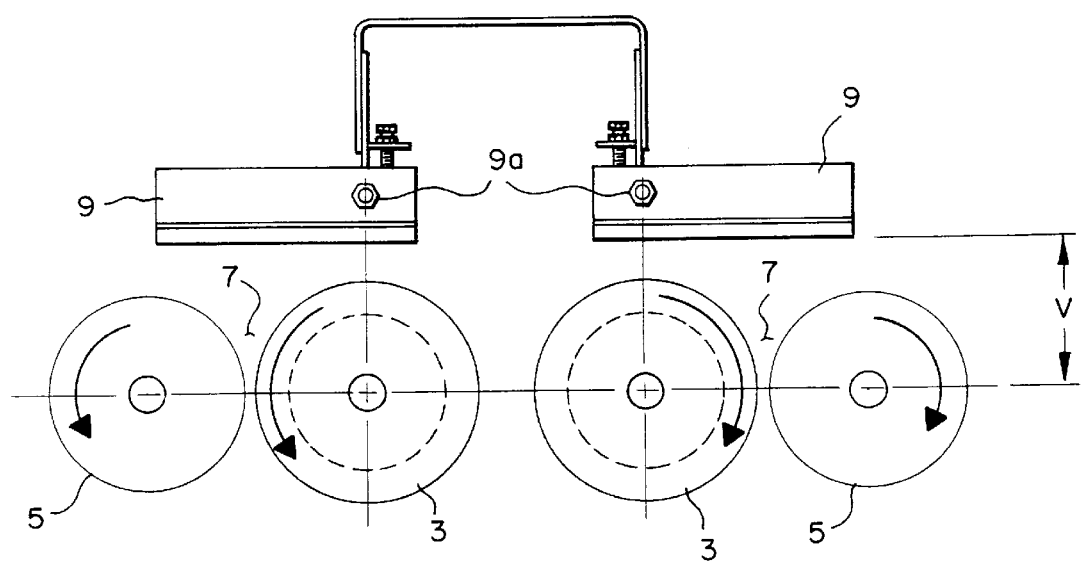
FIG. 2 is an upper cross-sectional view taken along line 2—2 of FIG. 1.
Figure 6:
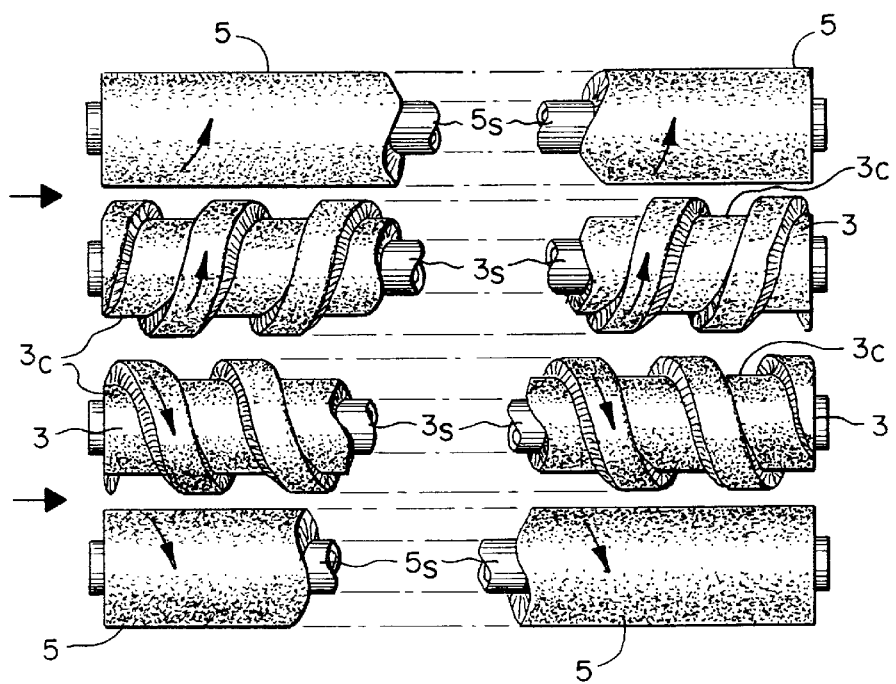
FIG. 6 is a partial top view showing in greater detail segmented portions of the expelling brushes and propelling brushes of the sorting device shown in FIG. 2.
Figure 10:
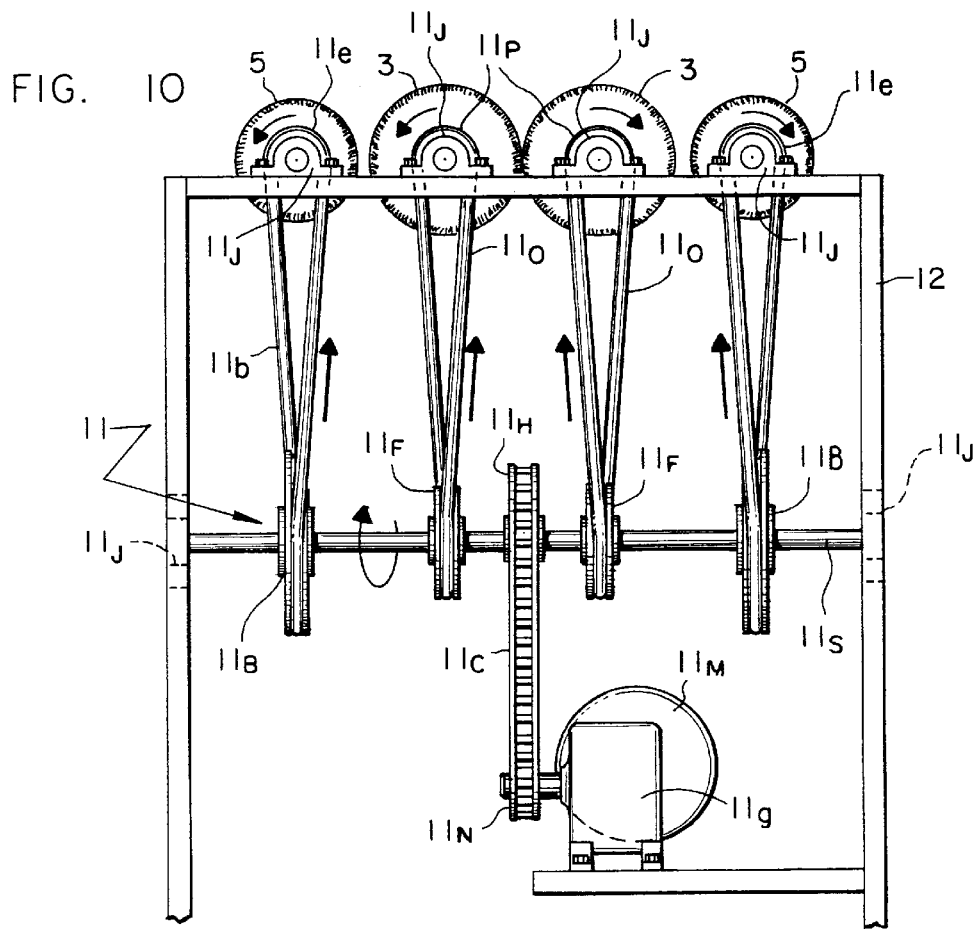
FIG. 10 is a cross-sectional view taken along line 10—10 of FIG. 1.

The depicted sorting device 1 includes a pair of brush rolls (i.e. a first brush 3 and second brush 5) which may, if desired, be paired in tandem relationships (as depicted by FIGS. 2, 6 and 10) particularly useful for sorting fruits or vegetables by size. The propelling brush 3 is equipped with suitable propelling means (depicted by a spiraled groove $3_c$) to move the unsorted pieces P along trough 7. In the preferred embodiment of the invention, the propelling brush 3 includes a spiral groove $3_c$ or channeled spiral recess appropriately sized so as to accommodate the particular type of piece P to be processed and sorted by the device 1. By maintaining its positioning within the receded spiral groove $3_c$, piece P moves along the trough 7 as the propelling brush 3 and the expelling brush 5 are rotated. As the propelling roller brush 3 revolves, the spiral groove $3_c$ of the propelling brush 3, propels the pieces P through the trough 7. Movement of the pieces P through trough 7 is generally effectuated by a brushing propelling movement of propelling brush bristles $3_D$ against an individual piece P. As explained later in greater detail, the movement of spherically shaped, rounded or curved surface pieces P through trough 7 reduces injury and damage to the pieces P.

The pitch of the spiral flighting and the rotational speed of the propelling brush 3 generally controls the speed at which the produce pieces P are propelled through trough 7. Spirals pitched at about four complete spiral winds for each linear foot at an operational use at about 60 to about 80 r.p.m. may be effectively utilized to propel the pieces along trough 7. Faster or slower rotational speeds and longer or shorter spiral pitches may be used, if desired.

The depth and width of spiraled channels may be altered to match the particular produce to be processed by the sorting device 1. Larger sized fruits and vegetables generally require deeper and wider furrowed spiral brushes than smaller sized produce pieces. A commercially available spiral roller brush identified as part No. 554, sold and distributed by Indusco, 105 Clinton Rd., Fairfield, N.J., modified so that the spiraled channel is cut to a ¾ inch deeper depth than the aforementioned commercially available version has been found especially well adapted for use as a propelling brush 3 in sorting of apples P. The spiral groove $3_C$ of this particular propelling brush 3 has a one inch face and measures five and one-quarter inch in diameter. Thus, the spiral groove $3_C$ may be cut deeper and wider so as to accommodate bigger or larger sized vegetable and fruit pieces P as depicted by the cross-sectional illustration of FIG. 7. The following table sets forth the suitable operational specifications of customized propelling brushes 3 for processing various different fruit pieces.

TABLE

| Produce Type | Furrow | |
| --- | --- | --- |
| | Depth | Width |
| Tomatoes | 1" | 2" |
| Apples | ¾" | 2" |
| Squash | 1½" | 3" |
| Pears | ¾" | 2" |
| Apricots | ¾" | 1¾" |
| Peaches | ¾" | 2" |
| Plums | ⅔" | 1½" |
| Avocados | 1" | 2" |
| Grapefruit | 2" | 2½" |
| Oranges | 1" | 2" |
| Tangerines | ¾" | 1¾" |
| Lemons | ¾" | 1¾" |

The spiral brush 3 and expelling smooth surfaced brush may be of the same length and axial mounting arrangement so as to permit a single device 1 to possess the diversity for processing many different sized produce P simply by replacing and fitting device 1 with the appropriate processing brushes 3 and 5 for the produce to be sorted therewith. For example, a user processing oranges P with the sorting device 1 and subsequently changing to the sorting of plums would simply replace the orange sorting brushes 3 and 5 with the appropriate plum processing brushes 3 and 5.

The expelling brush 5 is preferably a solid brush axially mounted in juxtaposition to the propelling brush 3 to form trough 7. The size and resiliency of the expelling brush 5 is adjusted so as to meet the particular requirements of the produce pieces P being sorted. Delicate produce pieces P such as tomatoes, apricots, etc. typically necessitate more gentle and delicate processing conditions. A softer bristled expelling brush 5 may be suitably used when processing such delicate produce. Conversely, the less delicate pieces (e.g. apples, pears, oranges, grapefruit, etc.) may be processed with a stiffer bristled brush 5. The expelling roller brush 5, when used to sort apples and other similar sized vegetables and fruits vary as may the propelling brush 3. For most applications, an expelling brush 5 measuring 4½" in diameter will perform exceptionally well. A commercial version of a roller brush identified as part No. 553, sold and distributed by Indusco (supra), may be effectively utilized as a propelling brush 5 for tomatoes whereas a propelling brush identified as Brush No. 552 distributed by IBC, P.O. Box 2608, Pomona, Calif. 91769 may be utilized more effectively as a propelling brush 3 for sorting apples.

FIG. 10 depicts a suitable drive means 11 (generally enumerated by 11) for rotationally rotating the first brushes 3 and the second brushes 5. The rotational speed (r.p.m.) of the brushes 3 and 5 is regulated so as to maximize the overall capacity of the sorting device 1. Maximum capacity is generally accomplished by maintaining the processing pieces P in full contact with the brushes 3 and 5. If pieces P begin to bounce within the trough 7, then the rotational speed of the brushes 3 and 5 is usually too fast and should be slowed so as to maintain a uniform contact of pieces P onto brushes 3 and 5. Rotating the brushes 3 and 5 at the proper rotational speed allows for uniform transportation and orientation of the pieces P along the trough 7. Different produce may necessitate different rotational speeds. The more spherically shaped produce generally require a higher r.p.m. than oblong shaped produce pieces. In the preferred embodiment of the invention, the expelling brush 5 is operated at a higher revolutionary speed than propelling brush 3. Typically the expelling brush 5 will operate at a speed of at least 120 percent greater than propelling brush 3. Under most operating conditions, the ratio of the expelling brush 3 rotational speed to the propelling brush rotational speed will range from about 3:2 to about 5:1 and most preferably at about 2:1.

Illustrative operative rotational speeds (r.p.m.) for the second smooth bristled brush 5 range from about 25 to about 200 r.p.m. and preferably from about 60 to about 120 r.p.m. Rotational movement of brushes 3 and 5 at different rotational speeds may be accomplished by connecting brushes 3 and 5 to a suitable drive means (generally referenced as 11) for driving brushes 3 and 5 at the suitable rotational speeds. A preferred embodiment of drive means 11 for driving brushes 3 and 5 at different rotational speeds is depicted by FIG. 10. Brush 3 and brush 5 may be appropriately equipped (at the feed or shaft end) with two inch pulleys $11_e$ and $11_p$. Expelling brush 5 and pulley $11_e$ are driven by expelling drive belt $11_b$ while propelling drive belt $11_o$ serves to drive propelling brushes 3. Expelling drive belt $11_b$ and propelling drive belt are respectively driven by expelling brush drive pulley $11_B$ and propelling brush drive pulley $11_F$ which are driven by drive shaft $11_S$. The expelling brush drive pulleys $11_B$ are sized so as to provide faster rotational speed than the propelling brush drive pulleys $11_F$. For most applications, pulleys $11_B$ will be about two times larger in diameter than pulleys $11_F$. The use of 4-inch diameter expelling brush drive pulleys $11_B$ and 2-inch diameter propelling brush drive pulleys $11_F$ are particularly well suited for this purpose. Drive pulleys $11_F$ and $11_B$ are rotationally driven about drive shaft $11_S$ by drive shaft sprocket $11_H$ (e.g. a 4-inch diameter, 24-teeth sprocket), which in turn is chain driven by chain $11_c$ (e.g. a 40 pitch) sprocketed by power sprocket $11_N$ (e.g. a 2.5 inch, 14-teeth sprocket) operationally connected and driven by gear reducer $11_G$ and gear motor $11_M$. The gear reducer $11_G$ operated at a 10:1 gear ratio delivers 172 r.p.m. of power to power sprocket $_{11}$ N and a rotational speed of 80 r.p.m. to drive shaft $11_S$.

Figure 5:
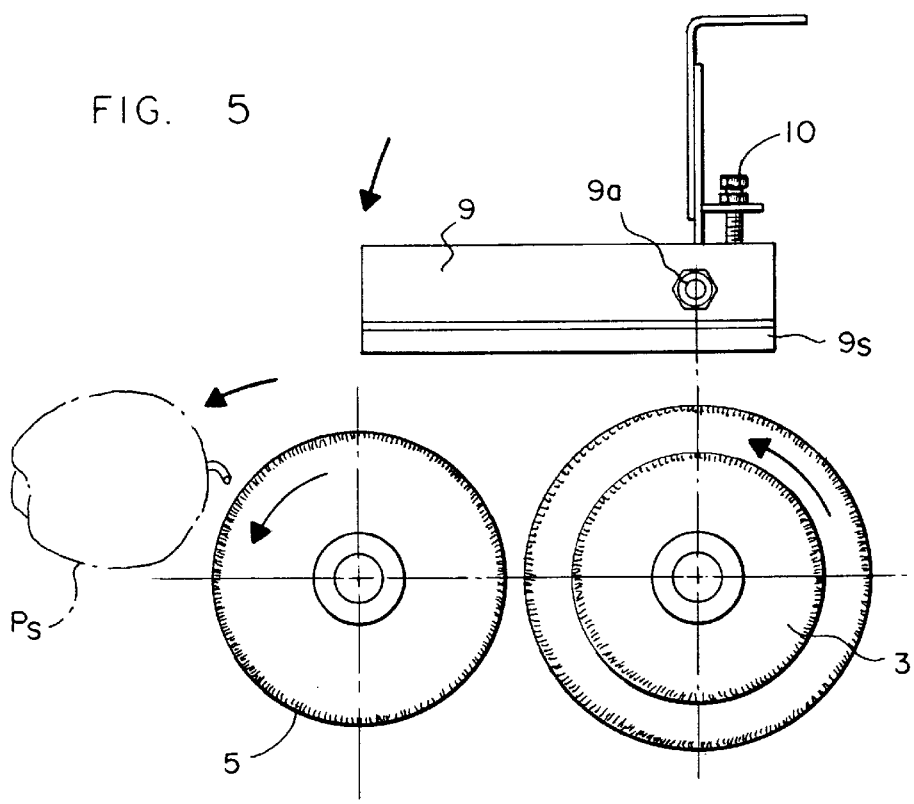
FIG. 5 is another illustrative cross-sectional partial view of the device depicted in FIG. 4 illustrating the expelling of the selected produce piece from the device.

The longitudinally moving pieces P are sorted upon making contact with a contacting member 9 as particularly illustrated by FIGS. 3–5, and 11. The contacting member 9 should provide sufficient contacting surface $9_s$ or frictional contact to retain and prevent a contacted piece $P_c$ from further longitudinal movement along trough 7. The contacting surface $9_s$ should be sufficiently pliable or resilient so as not to damage the contacted produce piece $P_c$. The contacting surface $9_s$ of the contacting member 9 should also be of sufficient length so as to guide and expel the contacted piece $P_c$ at a discharging site usually past the vertical axial bisect of the expelling brush 5. The contacting surface $9_s$ of the contacting paddle 9 may be appropriately constructed of a material possessing a sufficient high coefficient of friction and gentleness so as to retain the piece $P_c$ for expulsion by the expelling roller brush 5. Rubber matting, rubber coatings, matted or pebbled plastics, wood, metals, etc. may be effectively utilized for this purpose. When pieces P contact contacting member 9, the contacted piece $P_c$ is stopped from further forward or longitudinal progress by contacting member 9. The rotation of the expelling brush 5 (as shown by FIGS. 3–5) rotates the idled contacted piece $P_c$ around the peripheral margin of expelling brush 5 until the contacted piece $P_c$ is expelled from the trough 7 as the sorted piece $P_s$.

Contacting members 9 are designed to gently stop and guide a stopped piece $P_c$ about the peripheral boundary of expelling brush 5 until expelled therefrom. The contacting member 9 may be of various different constructions and configurations which, in cooperation with expelling brush 5, apply sufficient pressure to stop and guide the contacted piece $P_c$ about brush 5. The contacting member 9 should provide sufficient pressure upon the contacted piece $P_c$ to stop its longitudinal movement through trough 7 while also affording sufficient resiliency so as to allow the contacted piece $P_c$ to orbit about brush 5. Elastic strips or bands which stop and expel in combination with the expelling brush 5 (not shown e.g. constructed of rubber) may also be adapted for this purpose if desired.

Contacting paddles 9 are designed so as to place a constant and gentle biasing force upon the contacted piece $P_c$. This prevents damage to the contacted pieces $P_c$. As may be observed from FIGS. 3–5 and 11, paddles 9 are hinged $9_a$ a so that, as the expelling force exerted by brush 5 upon the contacted pieces $P_c$ increases, the hinged contacting paddle 9 pivots upwardly so as to decrease the total amount of pressure or force exerted upon the contacted piece $P_c$. The variable and decreasing pressure as compensatedly provided by the hinged contacting paddle 9 renders the contacting paddle 9 and the resilient bristles $5_b$ of the expelling brush 5 particularly well suited for sorting of thin-skinned and delicate fruits and vegetables. In the preferred embodiments of the invention (as particularly illustrated by FIGS. 2–5), the hinging of contact paddles 9 at hinge $9_a$ is preferably placed along at the vertical axis of the longitudinal centroid axis of propelling brush 3. As further illustrated by FIGS. 2–5, the contact paddle 9 preferably extends to a position along expelling brush 5 so as to permit the expelling brush 5 to expel the contacted fruit $P_c$ from the device 1.

Figure 11:
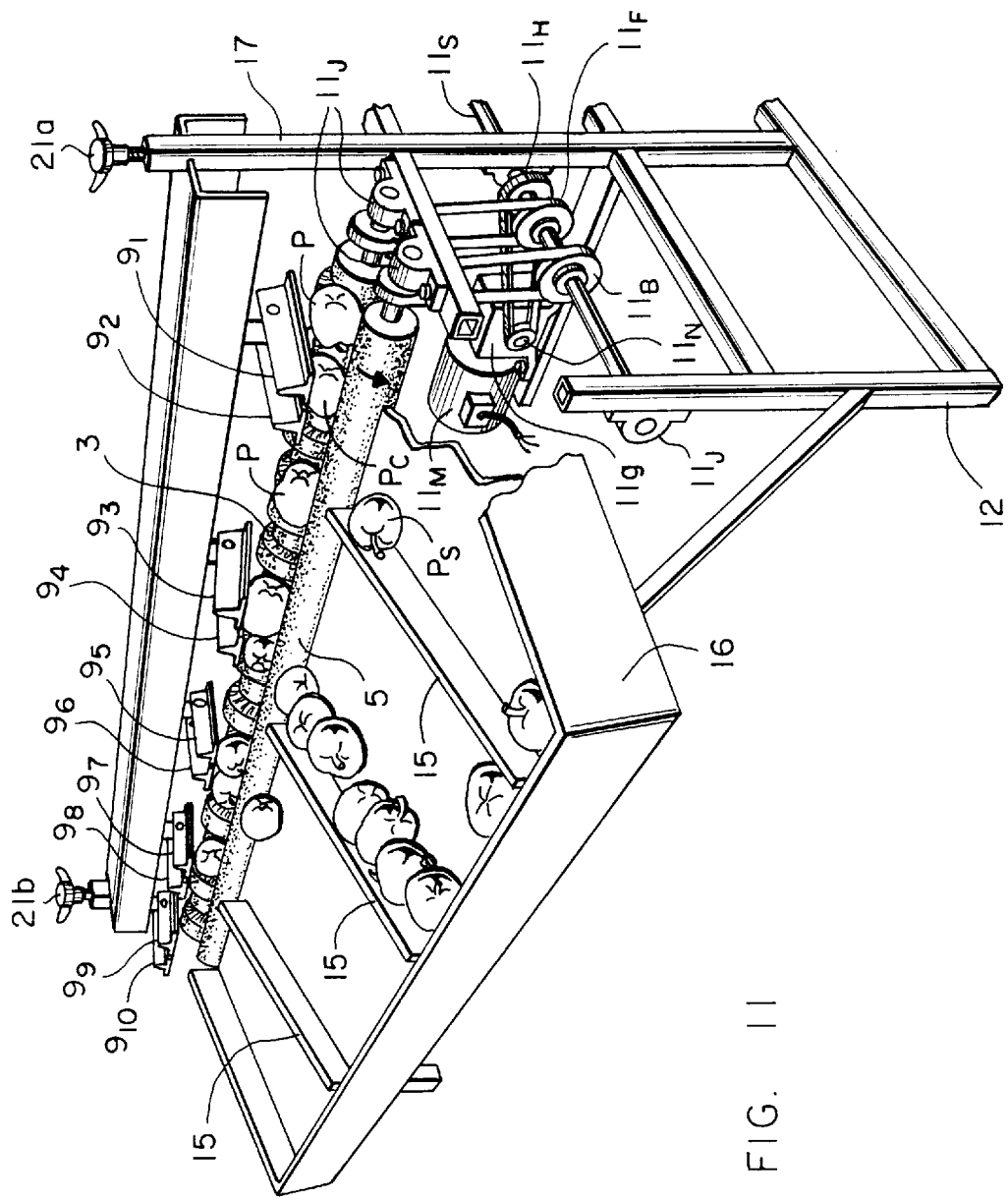
FIG. 11 is a perspective view of the device shown in FIG. 1.

The device 1 and its use to sort fruit pieces P of various fruit sizes and to distribute the sorted pieces $P_s$ at various stations positioned along the trough 7 is more filly illustrated by FIG. 11. The contacting member 9, propelling brush 3 and elongated expelling brush 5 are supported by framework 12. Supported by framework 12 and extending downwardly from expelling brush 3, is a ramped sorting table 16 partitioned by dividers 15 so as to provide different sorting stations for manually packing the sorted fruit $P_s$.

In the preferred embodiment of the invention as illustrated by the drawings, the contacting members 9 comprise hinged contacting paddles 9 preferably equipped with elevational adjusting means (shown collectively as 19, $21_a$, $21_b$, and 10) which permit the contacting paddles 9 to be adjusted to the appropriate distance V (e.g. see FIG. 2) from trough 7. Each contacting paddle 9 may be preset so as to permit a sorting of pieces P to sorted pieces $P_s$ of a desired sorted size. Elevational adjustable beam 19 allows for simultaneous adjustment of the contacting members 9 to the appropriate elevational sloping level above trough 7. This embodiment may be observed from FIGS. 1 and 11 wherein a pair of vertical support columns 17 positioned at opposite ends of brushes (3 and 5) and extending vertically upward from framework 12 serve to support an elevationally adjustable support beam 19. Support beam supports the contact paddles 9 and is equipped with elevational adjustable means 11 for elevationally adjusting bar 19 along the longitudinal axis of brushes 3 and 5. Vertical adjustment of support beam 19 will alter the distance V between paddle 9 and trough 7. Support bar 19 is fitted at both ends with threaded elevational adjusters $21_a$ and $21_b$ which permit elevational bar 19 to be adjusted upwardly or downwardly at either end of support columns 17.

In the sorting operation, it is generally desirable to progressively pre-sort fruit pieces by initially sorting the larger pieces and progressively decreasing sorting size leaving the smaller sized fruit pieces to be expelled from the trough 7. In the depicted sorting device 1 of FIGS. 1 and 11, threaded elevational adjusters $21_b$ and $21_a$ may be, accordingly, adjusted so that beam 19 rests at elevational adjuster $21_b$ at a higher elevational level than at elevational adjuster $21_a$. Beam 19 and the supported contacting members 9 rest at a slightly declining slope. This allows for the larger sized fruit pieces to be initially expelled first at the appropriate stations of table 16. Support bar 19 is, accordingly, especially suited to progressively size by ramping support bar 19 downwardly along trough 7 so as to place the bar 19 and suspended paddles 9 in progressively decreasing distanced sizing arrangement. For example, the first paddle 9 is set thereby to contact the largest pieces, the next larger size of produce contacts paddle $9_2$, a more intermediate size at paddle $9_3$, a smaller sized at paddle $9_4$ etc. for paddles $9_5$–$9_{10}$. Thus, by properly ramping bar 19 so that the receiving side of bar 19 rests at a higher elevation than the rearward portion of bar 19, contacting members 9 may be progressively calibrated to contact and expel fruit pieces of a progressively smaller dimensional size. Bar 19 may then be adjusted at one end or the other end so as to provide a gradient elevation difference between the respective contacting members 9 and trough 7.

Since said excessively small sized fruit pieces are typically used to prepare fruit juicers (e.g. oranges, grapefruits, etc.), the undersized fruit pieces may be simply allowed to pass through the trough 7 without contacting paddles 9, exit and collected from the device.

In the preferred embodiment of the invention, each contacting paddle 9 is also provided with separate elevational adjustment means 10 for adjusting each paddle 9 to the appropriate elevational level v for proper sizing. As shown in FIGS. 2–5, 11 and 12, each of the contacting paddles 9 may be equipped with a micro-height adjusting screw which, upon fine-tuning adjustment, permits each contacting paddle 9 to be adjusted to a predetermined and desired elevational level positioning V for precise sorting. Many different sized pieces P can be sorted at one time with the depicted sorting device 1. As illustrated, several paddles may be supported at different locations along trough 7 by support bar 19. Each contacted paddle 9 can be elevationally adjusted to a precise height v above the trough 7 by turning a screw 10 which adjusts the contacting height v of hinged paddle 9. Turning the screw 10 in one direction raises the contacting surface of paddle 9 while turning screw 10 in the opposite direction will lower the contacting surface of paddle 9.

For most produce P sorting operations, it is desirable to position two or more contacting members 9 to serve a single collecting station, site as illustrated in FIG. 11. A collecting station as depicted, constitutes a boundaried region of table 16 between dividers 15. A tandem positioning of two contacting members 9 in proximity to one another permits a range of sized produce $P_s$ to be contacted and expelled by the tandemly arranged contacting members 9 to a collecting station. For example, the first contacting member $9_1$ of a tandem set could be set to make contact upon a 4½" diameter apple while the other contacting member $9_2$ of the tandem set would be adjusted so as to sort and expel 4½" diameter apples and thereby provide apples sized within the 4½" to 4½" range at the first sorting station. The next tandem set $9_3$ and $9_4$ would be set to provide sorted apples of a 4" to 3½" size range at the next succeeding sorting station. The next sequential tandem set of contacting paddles $9_5$ and $9_6$ are set, for example, to contact apples ranging from 3½" to 3" which, in turn, would permit sorted apples within this size range to be sorted at the next sequential sorting station. Contacting members $9_7$ and $9_8$ may then be respectively set to contact apples of 2¾" to 2½" range while contacting members $9_9$ and $9_{10}$ may be respectively set to deliver apples of the 2¼" to 2" size to the last sorting station.

In another embodiment of the invention, there is provided a device for orientating pieces and applying informational decals to the oriented pieces. The spinning motions of the propelling brush 3 and the expelling brush 5 have been found to align irregular rounded or oblong shaped pieces P the cored fruits, such as apples and pears, within the trough 7, namely by aligning the fruit core so it aligns substantially parallel to the longitudinal axis of the brushes 3 and 5. This uniform aligning and positioning of irregular-shaped pieces P also allows these pieces P to be accurately sized and sorted because of the uniformity in orientation of each piece $P_c$ making contact onto the contacting member 9. For example, apples are taller than they are wide. If the apples were not positioned uniformly within trough 7, some apples would be sorted by their width while other apples would be sorted by their height. This, in turn, would lead to non-uniform size sorting.

Figure 7:
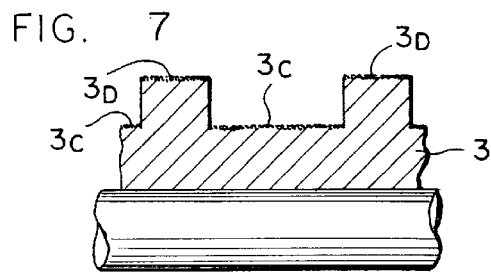
FIG. 7 illustrates an enlarged and partial cross-sectional view of a segmented portion of the propelling brush shown by FIG. 6.
Figure 8:
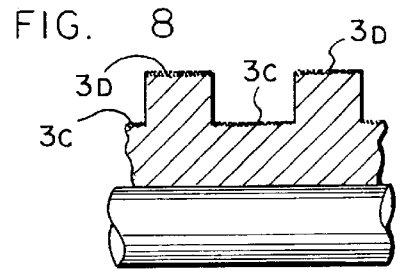
FIG. 8 illustrates a partial cross-sectional view of a propelling brush shown in FIG. 6 configured to propel pieces of a smaller dimensional size.
Figure 9:
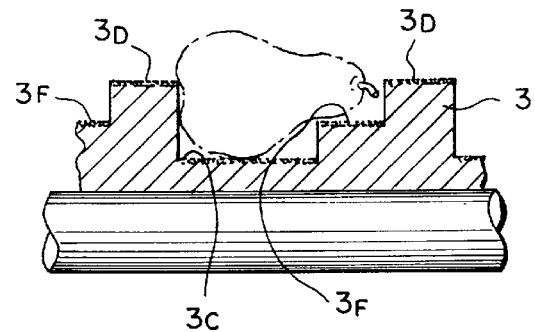
FIG. 9 depicts another cross-sectional view of a modified embodiment of the propelling brush of FIG. 6 wherein the propelling brush includes a flighted spiral winding for effectuating an axial alignment of a produce piece therewithin.

Particularly effective for aligning produce pieces P so that the major longitudinal axis of the produce piece P becomes aligned to the major longitudinal axis of trough 7 involves the use of spiral brushes 3 equipped with stepped or flighted channels as illustrated by FIG. 9. The flighted or stepped spiral brush 3 contains two or more furrowed channels ($3_C$ and $3_F$) of varying recessed depth and, if desired as shown, furrowed width. The deeper furrowed channel $3_C$ of the spiral brush 3 serves as a seat for the bulbous or butt section of the produce P while the steeped furrowed section $3_F$ of lesser depth serves as a seat for the neck of the produce piece P. Irregularly shaped fruit and vegetable pieces P and especially those having a bulbous and necked sections such as apples, pears, etc. may be effectively axially aligned by this technique. In the case of Red Delicious apples of an unsorted size and ranging from about 4½" to about 2" in diameter size, a flighting of the deeper grooved channel $3_c$ to a depth of about ¾" to about 1¼" (preferably at about 1"), a width ranging from about ¾" to about 4½" (preferably about 1") and the shallower channel $3_F$ to a recessed depth ranging from about ¼" to about ¾" (preferably at a depth of about ½") and a channel width ranging from about ¾" to about 1¼" (preferably at a channel width of about 1") provides a particularly effective technique for aligning the delicious apples P along trough 7. For pears the same flighting would apply except the deepest grooved channeled would preferably be about 1¼" in depth by reason the pear bulbous section is larger in size than the apple. After the produce piece P becomes aligned as shown in FIG. 7, the label may be applied to the correct position by manual application or by conventional mechanical label applying devices. The uniform positioning and orientation of cored produce provides a unique method for applying self-adhering labels to produce pieces P. The proper label placement typically necessitates labeling in a bulged region in a plane aligned along the major axis of the fruit piece P. As the pieces P move through trough 7, labels by conventional labeling techniques may be properly placed in a substantially uniform positioning upon each piece P. This pemits apples to be labeled with a label which may be readily read by the consumer by viewing slightly above its axial core in the bulbous region of the apple.

The depicted sorting device 1 includes a suitable feeding means (generally prefixed by 30 series enumeration) for feeding the unsorted pieces P to trough 7. The feeding means 30 aligns unsorted produce P in single file for feeding to sorting device 1. The feeding means 30, as depicted by FIGS. 1 and 12–15, include a unique series of cleaning cavities 31 laterally disposed between cavitated cleaning members 34 carried by a continuous conveyor 33. The cavities 31 serve to separately transmit, within each cavity 31, a single unsorted piece P from a produce holding tank T or other appropriate feed source to sorting device 1. While transporting the piece P, the cleaning members 34 gently brush against the produce piece P in a unitary direction causing a rotational movement of each unsorted piece P within each cavity 31. The feeding means 30 serves to deliver at individual unsorted pieces P to the propelling brush 3 for sorting. The individual and intermittent depositing of individual produce pieces P onto trough 7 by the conveying cavities 31 of device 1 allows, without any bunching of produce pieces, the propelling brush 3 to individually propel a single produce piece at any given point along the longitudinal axis of trough 7.

Grooved cylindrical brushes 34 sized to receive the pieces P to be transported by the feeding device 30 may be laterally positioned and axially mounted to chain conveyor 33 to provide a series of continuous conveying cavities 31. The cylindrical brushes 34 include recessed bristled regions $34_R$ placed in juxtaposition to recessed bristled regions $34_R$ (e.g. see FIG. 13) of adjacently positioned brushes $34_b$ so as to provide a series of aligned conveying cavities 31. Two cylindrical brushes 34 are secured at opposite ends of a shaft $36_S$. Shafts $36_S$ fitted with parallelly aligned, grooved cylindrical brushes 34 are axially mounted to chain conveyor 33 in a laterally spaced relationship sufficient to provide a cavity 31 for retaining and conveying a separate piece P such as a produce piece P therewith. The bristled regions $34_R$ of each brush 34 includes a circumscribing concave bristled section $34_R$ configured to seat onto the particular produce piece P to be cleaned and conveyed by device 30.

The unique feeding device 30 depicted by FIGS. 1 and 12–15 generally comprises a series of laterally positioned cleaning members 34 which form conveying cavities 31, a continuous conveyor 33 for axially mounting of the cleaning members 34 thereto and rotating means 36 for rotating the member 34 so as to effectuate effective cleaning of the produce pieces P within cavities 31. The laterally positioned cleaning members 34 are equipped with axial mounts $_{36}$ a so as to permit a rotation of the members 34 while conveying the rounded pieces P with conveyor 33. Cleaning members 34 are individually comprised of a cleaning member (marked as $34_a$ for illustrative purposes in FIGS. 14–15) equipped with axial mounting means $36_a$ for axially mounting member $34_a$ to conveyor 33. Cleaning member $34_a$ is equipped with a pliable recessed cleaning region (referenced as $31_a$ for illustrative purposes in FIG. 14) channeled around member $34_a$ and laterally aligned in juxtaposition to an adjacent recessed region (references a $31_b$ for illustrative purposes in FIG. 14) of an adjacently positioned cleaning member (referenced $34_b$ for illustrative purposes) so as to provide a cleaning cavity 31 for separately receiving and retaining a single rounded object P therewithin. A continuous conveyor 33 equipped with lateral axial mounts $36_a$ for laterally and axially mounting the members 34 to the conveyor 33, supportively serves to convey members 34 and unsorted piece P feeds from holding tank T to trough 7. The rotating means 36 for axially rotating said members 34 serve to clean the pieces p within the cavities 31 while also allowing the pieces P to be conveyed by the members 34 along the continuous conveyor 33.

A particular suitable arrangement depicted by FIG. 13 for providing a series of aligned cavities 31 involves equipping a series of axially mounted shafts or rollers $36_s$ with cylindrical brushes 34 circumscribingly grooved so as to provide a channeled margin $34_R$ for retaining a partition of the produce piece P therewithin . Each roller $36_s$ may be fitted with one or more cylindrical brushes 34 having bristles $34_P$ arranged upon roller $34_s$ so as to provide a grooved or concave recessed region $34_R$ contoured to partially serve as seating for piece P. As may be particularly observed from FIGS. 13–14, the grooved recessed region $34_R$ circumscribes each roller $34_R$ so that the rotation will not alter the configuration of the cavities $31_a$ and $31_b$ between brushes $34_a$ and $34_b$. It may also be observed that each brush $34_a$ shares two adjacent cavities 31 with its two immediately positioned adjacent brushes $34_b$. The brush shafts $36_s$ are axially mounted at both ends to conveyer 33 and in a lateral relationship to other shafts $36_s$ so that each recessed region $31_a$ of any given brush $34_a$ forms in cooperation with an adjacently recessed region $31_b$ of two adjacent brushes $34_b$, two complete laterally disposed cavities 31 for separately receiving and retaining unsorted pieces P therewithin. The conveyor 31 includes a series of the laterally disposed brushes 34 circumferentially grooved which collectively provide a continuous series of laterally disposed cavities 31 along the entire length of the continuous conveyor 33.

The feed mechanism 30 preferably includes drive means 36 for axially rotating the pieces P at a predetermined rotational speed. In the preferred embodiments of the feeding device 30, brushes 34 are designed to axially rotate about shaft $36_s$. The rotation of brushes 34 causes produce pieces P carried by the cavities 31 to undergo a rotational movement. This rotational movement arises by reason of the rotational effect the bristles $34_P$ of brushes 34 have upon the produce pieces P as the bristles $34_P$ sweep across the surface of the produce piece P. Cleaning reagents and microbiocides applied to the rotating pieces P afford a cleaning and sanitation of the produce pieces P within the cavities 31.

Figure 12:
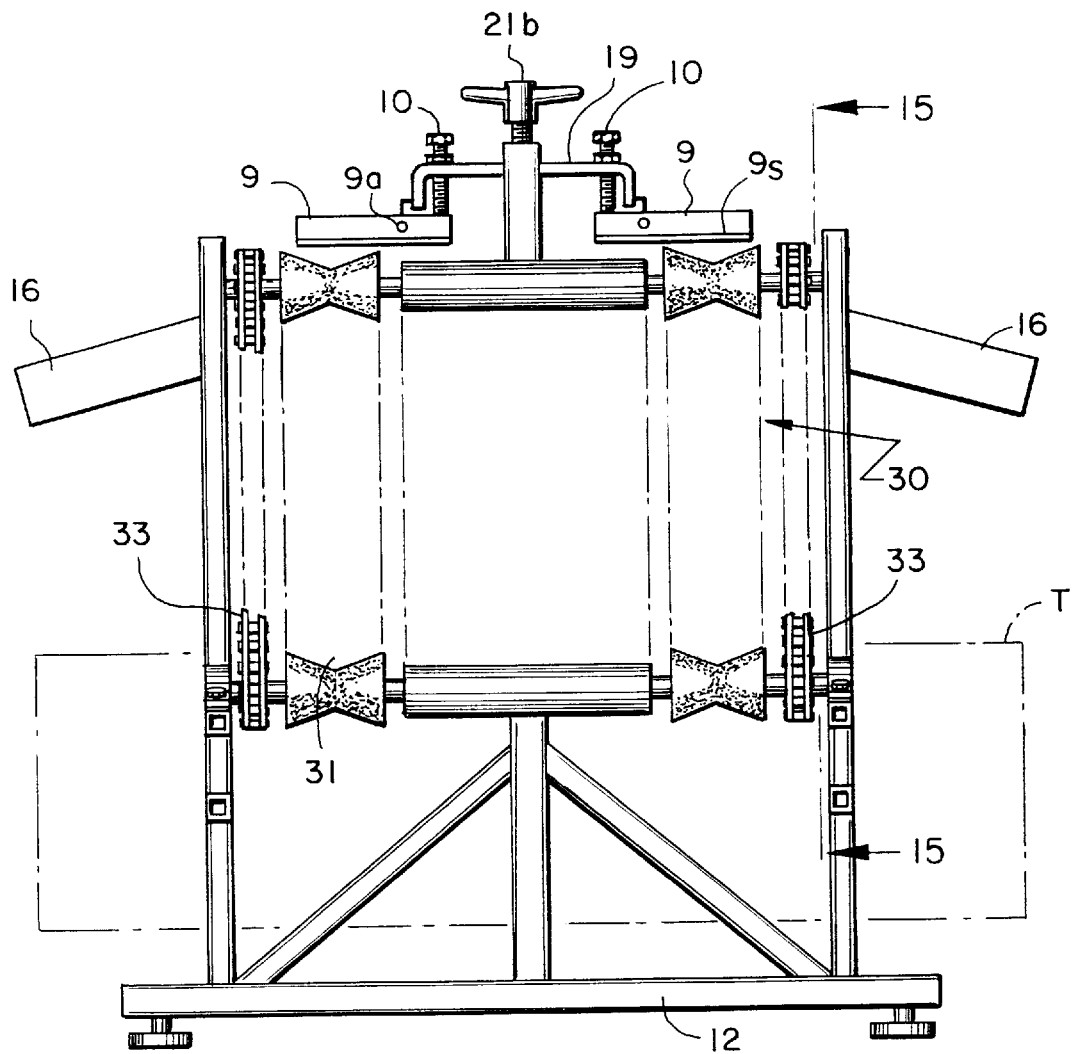
FIG. 12 is an elevational view showing in greater detail the feed conveyor depicted in FIG. 1.

Rotational movement of the brushes 34 may be effectuated by fitting each shaft $36_s$ with a tractional surface $36_T$ and an interfacing locomoting surface $36_L$ in an interfacing relationship to the tractional surface so that interfacial movement of the tractional surface $36_T$ upon the interfacing surface $36_L$ causes rotational movement of the shaft $36_s$ and attached brushes 34. A rubber winding about shaft $36_s$ or other tractional surface $36_T$ about shaft $36_s$ as depicted in FIGS. 12–14 provides a particularly effective tractional surface $36_T$ for shaft $36_s$. An immobile interfacing surface $36_L$ such as the stationary apron $36_L$ depicted in the drawings or mobile apron (not shown) operated at varying interfacing speeds so as to vary the rotational speed of brushes 34 provides a particularly effective drive means 36 for imparting axial rotation to brushes 34.

The depicted feeding device 30 includes a pair of laterally disposed chains 33 driven by drive shaft $33_S$ about drive sprockets $33_D$ and spacer sprockets $33_G$. Sprockets $33_D$ and $33_G$ are supportively carried by an adjustable feed support frame 37 operationally disposed in an inclined ramping position so as to be positionally adapted for placement into a holding tank T containing floating produce pieces P The feed end of feeding device 30 is equipped with a feeding apron which serves as a point of entry for the floating produce pieces P to the conveying cavities 31. Threaded bolts $37_F$ threading support frame 37 onto chain support frame $36_C$ affords a suitable adjustable means for raising or lowering the inclination of the feeding device 30 to the proper feeding level. Although any suitable means for placement of the produce piece P may be used (including manual or mechanical), the use of holding tank T to provide floating feed pieces P serves as a suitable feeding system for raw produce. The floating produce pieces P should flow uniformly and continuously onto the feeding apron and cavities 31 without excessive bunching and concomitant injury by an excess feed supply or to slow of a feed for conveyor 33. The incline should be adjusted so the produce pieces P flow uniformly onto feed apron 39 and fill each available cavity 31 with a produce piece P.

The feeding device 30 is suitably fitted with sanitizing means 40 which may be used periodically or continuously to decontaminate cleaning member 34. Since produce pieces P are readily susceptible to microbial contamination, it is desirable to periodically decontaminate the feed mechanism 30 on a periodic basis. Contamination of the feeding equipment 30 can inoculate the processed produce pieces P with microbial contaminates which may lead to premature spoilage of the produce P. Disinfecting jets connected to disinfectant source 40 for spraying disinfectants upon the produce pieces P or brushes 34 upon each revolution of the conveying brushes 34 affords a particularly effective sanitizing means 40 for protecting the processing equipment and processed produce against costly microbial contamination. Preservatives, sanitizing and cleansing reagents (e.g. germicides, insecticides, fungicides, soap, etc.), coloring additives, polishing agents such as emulsified waxes, etc. may be appropriately introduced by sanitizing means 40 to produce pieces p and fed through the feeding 30 and sorting device 1. Uniform distribution of the reagent additives from means 40 upon the conveyed food piece P is effectively accomplished by rotating and sweeping the piece surface across the bristled region $34_R$ of brush 34. Cleaning of the produce piece P is also effectuated by sweeping the bristles $34_P$ of the brush 34 across the produce piece P surface in the presence of an appropriate cleansing agent which, in some instances, may simply constitute a water wash. The rotation of the produce pieces P upon the brushes 34 will also effectuate an evaporating and drying effect upon water adhering to the produce piece P surface. Reducing the total amount of moisture deposited by pieces P upon the expelling brush 5 and propelling brush 3 provides for more sanitary conditions in sorting the pieces P with sorting device 1. Also, sanitizing reagents admitted to the feed side will typically be carried over to the sorting equipment side of the process and remain, if desired, as a protectant and stabilize upon the sorted produce $P_s$.

With particular reference to FIG. 15, feed conveyor 30 is also equipped with a locomoting means $36_X$ for reversing the rotational direction of the cleaning members 34 at the exiting end of conveyor 30. Reversal of the rotation enables the cleaning members 34 to more effectively expel the feed produce P This also prevents jamming of the conveyor by unexpelled feed pieces. An elastic reverse rotation strap $36x$ (e.g. such as a rubber strap, bungee cord, etc.) for stretched tautly against tractive surface $36_T$ as depicted in FIG. 15 will effectively serve to reverse the rotation of cleaning members 34 at the feed exit end.

The contacting member 9 may be equipped with an automatic counter so that each sorted piece $P_s$ is counted which in turn permits bagging at a collecting station a counted number of sorted pieces $P_s$ of the predetermined and desired size for each bag. The contacting member 9 may also be equipped to mechanically apply the appropriate label (including size) to the contacted produce piece P.

What is claimed is:

1. A sorting device for sorting of selected pieces of a predetermined dimensional size from unsorted pieces of diverse dimensional sizes, said device comprising:

a) an elongated first brush comprised of a spirally grooved brush equipped to rotationally move the unsorted pieces about a peripheral longitudinal axis of said first brush;

b) an elongated second brush comprised of a substantially uniform bristled brush laterally spaced apart from said first brush so as to form a trough for moving the unsorted pieces about the peripheral axis of said first brush;

c) drive means for rotationally rotating the first brush and the second brush in common rotational direction; and d) a contacting member comprised of at least one outwardly extending contacting arm pivotally mounted at one arm end to an elevated mounting site in a laterally positional relationship to said first brush, with said contacting member traversely bridging across said trough and said second brush with said contacting member being laterally spaced apart from said trough at a predetermined distance so as to permit tangentially contact upon the selected pieces and guide one of the selected pieces along said member from said trough by biasing the selected pieces between the contacting member and said second brush and allowing a rotational brushing movement of the second brush to guide the selected pieces along said contacting member until expelled therefrom by said second brush.

2. The sorting device according to claim 1 wherein the arm includes an elevational adjusting means for adjusting the arm so as to permit a selective sorting of the selected pieces of the predetermined size from the unsorted pieces.

3. The sorting device according to claim 1 wherein the arm includes a deformable surface to guide the selected pieces along said arm.

4. The sorting device according to claim 1 wherein the contacting member comprises a plurality of pivotally mounted sorting arms traversing said trough onto an orbital margin bordering onto said second brush.

5. The sorting device according to claim 4 wherein the sorting arms include variable adjusting means for adjusting the arms so as to selectively sort selected pieces of the predetermined size from the unsorted pieces.

6. The device according to claim 1 wherein the contacting arm includes a resilient contacting surface to tangentially contact upon the selected pieces and to guide the selected pieces along said surface until expelled therefrom by said second brush.

7. The sorting device according to claim 1 wherein the device includes at least two contacting arms and the device includes an adjustable depth adjuster for adjusting the distance between the trough and the contacting arms.

8. The sorting device according to claim 7 wherein the arms are pivotally mounted at mounting sites positioned above the first brush, each of said arms includes a horizontal stop for stopping the arms at a horizontally aligned position and the arms extend outwardly from the mounting sites to a terminal arm end in juxtaposition to said second brush.

9. A sorting device for sorting selected pieces of a predetermined size from unsorted, irregularly sized pieces, said device comprising an elongated trough equipped with a longitudinal passageway for conveying the unsorted pieces therethrough, propelling means for propelling the unsorted pieces along the longitudinal passageway, a pivotally mounted contacting arm equipped with a tractive surface traversing the passageway for stopping a piece of the predetermined size within the trough and retainingly guiding the piece along the tractive surface, and rotational expelling means for pliably biasing the piece against the contacting arm andadvancing the piece along said tractive surface by allowing the pivotal movement of the arm and a rotational movement of the expelling means to guide the piece along the surface of the arm until expelled therefrom.

10. The sorting device according to claim 9 wherein the device includes an elongated first brush equipped to rotationally move the unsorted pieces about a peripheral longitudinal axis of said first brush, an elongated pliable second brush laterally spaced apart from said first brush so as to form the trough and the longitudinal passageway for moving the unsorted pieces along the trough, and the propelling means comprises drive means for rotationally rotating the first brush and second brush in a common rotational direction.

11. The sorting device according to claim 10 wherein the first brush comprises a spirally grooved brush containing a spiraled grooved channel sized to propel the unsorted pieces along the peripheral axis when driven by the drive means, and the second brush serves as the expelling means for the pliably biasing of the piece against the contacting member and advancing the piece along the tractive surface until expelled at an expelling site.

12. A method for sorting selected pieces of predetermined sizes from unsorted and irregularly sized pieces with a sorting device comprised of an elongated trough equipped with a longitudinal passageway for conveying the unsorted pieces threrthrough, propelling means for propelling the unsorted pieces along the longitudinal passageway, a series of successive adjustable pivotally mounted contacting arms respectively equipped with a tractive surface traversing the passageway for stopping the selected pieces of the predetermined sizes within the trough and retainingly guiding the pieces along the tractive surface of said arms, an elevationally adjustable horizotal support beam which serves to support the successive arms in a elevationally sloped relationship to the trough and the arms include individual sizing calibrators for separately adjusting each of the contacting arms at a desired predetermined distance from the trough so as to permit tangential contact by said upon the selected pieces, and expelling means for pliably biasing the selected pieces against the tractive surface of said arms and expelling said selected pieces from said trough by advancing the selected pieces along said tractive surface of said arms to expelling sites for said arms, said method comprising:

a) adjusting the beam in a declining sloped relationship to the trough and calibrating the sizing calibrating for each of said arms at the distance from the trough so as to selected pieces of the predetermined size from the trough;

b) feeding the unsorted pieces containing the selected pieces to the elongated passageway;

c) propelling the unsorted pieces along the passageway;

d) contacting the selected pieces with the tractive surface of the contacting arms;

e) expelling the selected pieces with expelling means by pliably and biasingly advancing the selected pieces along the tractive surface of the arms to the expelling site by allowing a pivotal movement of the arms and a rotational movement of the expelling means to guide the selected pieces along said arms until expelled therefrom; and f) collecting the selected pieces from the expelling sites.

13. The method according to claim 12 wherein the contacting member of the device includes a series of successive adjustable pivotally mounted arms traversing the passageway, and the method includes initially adjusting the arms at varying elevational levels above the trough so as to permit the arms in cooperative association with the expelling means to expel selected pieces of differing sizes at different expelling sites.

14. The method according to claim 13 wherein the longitudinal passageway is disposed between an elongated grooved brush equipped with a spirally wound grooved channel sized to seat and propel the unsorted pieces along the trough and an elongated cylindrical expelling brush which serves as the expelling means for expelling the Selected pieces, and the arms are successively arranged in a tandem sequence along the passageway, and the method includes calibrating the tandem sequence so as to sort pieces of a predetermined size range at each of the tandem sequences.

15. The method according to claim 13 wherein the method is initially conducted upon unsorted pieces of the first produce type so as to provide the sorting of selected pieces of a first predetermined size range and thereafter the method is conducted upon unsorted pieces of the second produce type to provide selected pieces of a second predetermined size range for said second type and the method includes replacing a first propelling brush configured to accommodate unsorted pieces of the first produce type with a second propelling brush configured to accommodate unsorted pieces of the second produce type, and readjusting the horizontal support beam and recalibrating the tandem sequence so as to permit for the sorting of the selected pieces of the second predetermined size range from the unsorted pieces of the second produce type.

16. A method for sorting selected pieces of a predetermined dimensional size from unsorted pieces of differing dimensional sizes in a sorting device comprised of a spirally grooved brush equipped to rotationally move the unsorted pieces about a peripheral longitudinal axis of said first brush, an elongated second brush comprised of a substantially uniform bristled brush laterally spaced apart from said first brush so as to form a trough between the first brush and the second brush fog moving the unsorted pieces along said peripheral axis of said first brush drive means for rationally rotating the first brush and the second brush in common rotational direction so a to permit the unsorted pieces to move along the peripheral axis of the first brush; and a contacting member comprised of at least one outwardly extending contacting arm pivotally mounted at one arm end to an elevated mounting site in a laterally positional relationship to said first brush so as to permit a pivotal movement of the when the arms engagedly contact the selected pieces, said contacting member traversely bridging across said trough and said second brush with the arm of said contacting member being laterally spaced apart from said trough at a predetermined distance so as to permit tangentially contact upon the selected pieces and guide the selected pieces along said arm from said trough by tangentially contacting the selected pieces between the arm and said second brush so as to allow the pivotal movement of the arm and a rotational brushing movement of the second brush to guide the selected pieces along said arm until expelled therefrom by said second brush, and elevational adjusting means for adjusting the arm so as to permit a selective sorting of the selected pieces from the unsorted pieces, said method comprising:

a) adjusting the arm so as to permit a selective sorting of the selected pieces of the predetermined size from the unsorted pieces;

b) moving the unsorted pieces through said trough by rotationally rotating said first brush and said second brush with said drive means; and c) sorting the selected pieces in the trough from the unsorted pieces by tangentially contacting the selected pieces between said arm and said second brush and guiding the selected pieces along arm allowing the pivotal movement of the and the rotational brushing movement of said second brush to guide the selected pieces along said contacting arm until expelled from the trough by said second brush.

* * * * *